(12) United States Patent
Roux (10) Patent No.: US 9,900,055 B1
(45) Date of Patent: Feb. 20, 2018

(54) MAGNETIC PRESENCE DETECTION OF A SMARTPHONE

(71) Applicant: Conduent Business Services, LLC, Dallas, TX (US)

(72) Inventor: Pascal Roux, Chabeuil (FR)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 15/421,634

(22) Filed: Feb. 1, 2017

(51) Int. Cl.
*H04B 5/00* (2006.01)
*H04W 52/02* (2009.01)
*H04B 15/00* (2006.01)

(52) U.S. Cl.
CPC ......... *H04B 5/0031* (2013.01); *H04B 5/0043* (2013.01); *H04B 5/0062* (2013.01); *H04B 15/00* (2013.01); *H04W 52/0209* (2013.01)

(58) Field of Classification Search
CPC .. H04B 5/0031; H04B 5/0093; H04B 5/0025; H04B 5/0037; H04B 5/0056; H04B 5/0075; H04B 5/0081; H04B 5/0087; A63B 2024/0037; A63B 2024/0043; A63B 2220/833; A63B 2220/89; A63B 2225/50; A63B 2225/52; A63B 24/0021
See application file for complete search history.

(56) References Cited

U.S. PATENT DOCUMENTS

| | | | |
|---|---|---|---|
| 6,671,737 B1 | 12/2003 | Snowdon et al. | |
| 9,433,031 B2 | 8/2016 | Hiramatsu | |
| 9,444,522 B2 | 9/2016 | Yang et al. | |
| 9,460,433 B2 | 10/2016 | Proctor, Jr. et al. | |
| 9,496,927 B1* | 11/2016 | Grinberg | H04B 5/0093 |
| 9,507,015 B2 | 11/2016 | Krishnakumar et al. | |
| 9,521,648 B1 | 12/2016 | Kolekar et al. | |
| 2007/0299625 A1* | 12/2007 | Englert | A63B 24/0021 |
| | | | 702/150 |
| 2009/0283591 A1 | 11/2009 | Silbernagl | |
| 2012/0234914 A1 | 9/2012 | Roux | |
| 2012/0235508 A1* | 9/2012 | Ichikawa | H02J 5/005 |
| | | | 307/104 |
| 2013/0165041 A1* | 6/2013 | Bukovjan | G06Q 30/0242 |
| | | | 455/41.1 |

(Continued)

OTHER PUBLICATIONS

Trafton, A., New cheap NFC sensor can transmit information on hazardous chemicals, food spoilage to smartphone, Phys Org, Dec. 8, 2014, https://phys.org/news/2014-12-cheap-sensor-transmit-hazardous-chemicals.html, 3 pages.

(Continued)

*Primary Examiner* — Golam Sorowar
(74) *Attorney, Agent, or Firm* — Kermit D. Lopez; Luis M. Ortiz; Ortiz & Lopez, PLLC (57) ABSTRACT

A system and method for magnetic presence detection. A magnetic proximity detector is associated with a tag, wherein the tag transmits particular data when a mobile device is detected by the magnetic proximity detector, which can avoid needless battery consumption by the tag and/or the mobile device. A filter can be employed to filter out noisy magnetic signals so as to enhance a detection capability by the magnetic proximity detector and facilitate detection of the mobile device by the magnetic proximity detector.

20 Claims, 4 Drawing Sheets

(56) References Cited

U.S. PATENT DOCUMENTS

| | | | |
|---|---|---|---|
| 2013/0303143 A1* | 11/2013 | Schrader | H04W 12/08 |
| | | | 455/418 |
| 2014/0168174 A1* | 6/2014 | Idzik | G06F 3/03545 |
| | | | 345/179 |
| 2014/0201066 A1 | 7/2014 | Roux et al. | |
| 2015/0372720 A1 | 12/2015 | Shimshoni | |
| 2016/0156386 A1 | 6/2016 | Van Nieuwenhuyze et al. | |
| 2016/0189461 A1 | 6/2016 | Kanon et al. | |
| 2016/0254589 A1 | 9/2016 | Ju et al. | |
| 2016/0261973 A1 | 9/2016 | Socol et al. | |
| 2016/0275648 A1 | 9/2016 | Honda et al. | |
| 2016/0342821 A1 | 11/2016 | Nyalamadugu et al. | |

OTHER PUBLICATIONS

Shockley, J. A., Ground Vehicle Navigation Using Magnetic Field Variation, Dissertation, Graduate School of Engineering and Management, Air Force Instituted of Technology, Wright-Patterson Air Force Base, Ohio, Sep. 2012, 186 pages.

Subbu, K. P., et al., LocateMe: Magnetic-Fields-Based Indoor Localization Using Smartphones, ACM Transactions on Intelligent Systems and Technology (2013) 4(4), Article 73, 28 pages.

Burkard, S., Near Field Communication in Smartphones, https://www.snet.tu-berlin.de/fileadmin/fg220/courses/WS1112/snet-project/nfc-in-smartphones_burkard.pdf, 2012, 10 pages.

Michel, T. et al., On Attitude Estimation with Smartphones, International Conference on Pervasive Computing and Communications (2016, 11 pages., Oct. 5.

* cited by examiner

MAGNETIC PRESENCE DETECTION OF A SMARTPHONE

TECHNICAL FIELD

Embodiments are generally related to BLE (Bluetooth Low Energy) devices, methods, and systems. Embodiments also relate to the magnetic detection of mobile devices, such as smartphones, tablet computing devices, wearable computing devices, and so on utilizing RF (Radio Frequency) enabled tags.

BACKGROUND

Ticketing is an essential function in public transportation networks. A ticketing function must successfully address several key requirements from both the traveler's and the operator's perspectives. Typical traveler requirements may include ease of use (easy to learn and routine in practice), clear and visible pricing, secure with respect to loss, theft, or forgery, e.g., ticket books, passes, etc., and privacy preserving. Typical operator requirements of a ticketing function may include user acceptance (barriers to usage can quickly lead to a rejection of the transportation system by the public), security (confidentiality of the transaction, authentication, and non-repudiation, fraud resistance (amateur and organized)), and high availability. Additional requirements of the operator to ticketing functions will correspond to deployment costs, both for infrastructure (readers, validation systems, personnel, etc.) and mobility (tickets, cards, etc., in the hands of the traveler).

Near field communications ("NFC") is a set of standards for smartphones and similar portable user devices to establish radio communication with each other by touching them together or bringing them into close proximity, e.g., a few centimeters. The short-range wireless technologies employed in NFC operations typically require a distance of 10 cm or less. NFC requires an initiator and a target, with the initiator capable of actively generating an RF field that can power a passive target or communicate with an active target. This arrangement allows for the use of targets having a very simplistic form, such as tags, key fobs, stickers, cards, etc., which do not require batteries. NFC tags may be read-only or rewriteable, and may be custom encoded. NFC tags may be configured to provide various communication speeds, memory, and security, write endurance, etc. In some instances, the target may include a power source, e.g., NFC peer-to-peer communications. Examples of NFC enabled techniques are disclosed in U.S. Patent Application Publication No. 2014/0201066 to Pascal Roux et al, which published on Jul. 17, 2014 and is incorporated herein by reference in its entirety.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide a method and system for improving the magnetic detection of a smartphone and other types of mobile devices.

It is another aspect of the disclosed embodiments for allowing a tag (e.g., an RF tag, Bluetooth enabled tag, etc.) to communicate with and send data to a mobile communications device.

It is another aspect of the disclosed embodiments to provide for methods and systems for filtering slow variations of the terrestrial magnetic field in which a vehicle moves.

It is yet another aspect of the disclosed embodiments to provide for filtering periodical variations of alternating magnetic fields.

It is still another aspect of the disclosed embodiments to provide for the quick detection of the presence of a mobile device such as a smartphone without incorrectly detecting a strong alternating field.

The aforementioned aspects and other objectives and advantages can now be achieved as described herein. A system and method for magnetic presence detection are disclosed. A magnetic proximity detector is associated with a tag, wherein the tag transmits particular data when a mobile device is detected by the magnetic proximity detector so as to avoid needless battery consumption by the tag and/or the mobile device. A filter can be employed to filter out noisy magnetic signals so as to enhance a detection capability by the magnetic proximity detector and facilitate detection of the mobile device by the magnetic proximity detector. The tag can be implemented as a device that communicates via Bluetooth Low Energy (BLE) communications. The disclosed magnetic proximity detector involves the tag and user device (e.g., a mobile device) communicating via Bluetooth communication ("BLE").

In some example embodiments, the tag may be implemented as a Bluetooth-enabled tag used in, for example, public transport vehicles (e.g., buses, subways, trams, etc.) to enable travel validation with mobile phones and other mobile communication devices. The disclosed embodiments thus describe a solution to implement a magnetic proximity detector that can cause the tag to send Bluetooth data (e.g., advertisements, messages, etc.) only when a nearby mobile device is detected, so as to avoid needless battery consumption. This approach describes a technique to filter out noisy magnetic signals such as the Earth's magnetic field, and alternative magnetic fields caused by external structures present in the urban environment, such as electric railway catenaries, tracks, or tramways, and so on.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the disclosed embodiments.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation".

Figure 1:
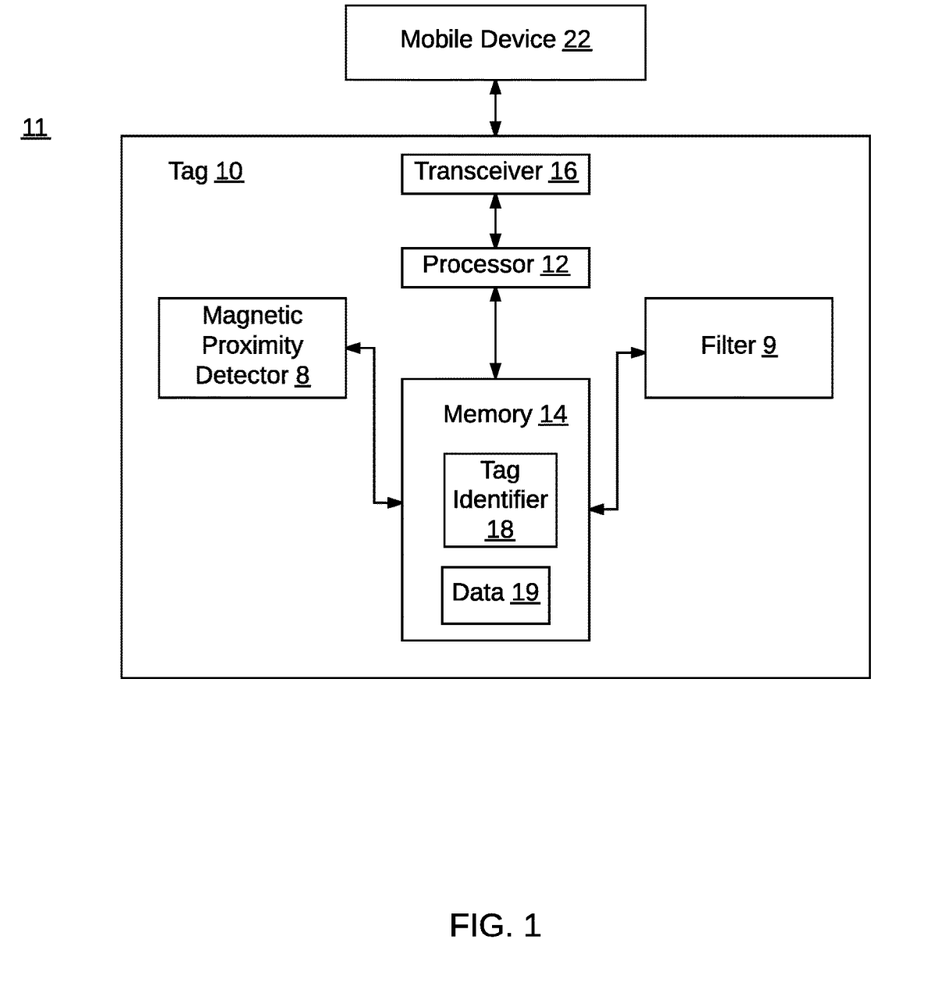
FIG. 1 illustrates a block diagram depicting a system for the magnetic presence detection of a mobile device, in accordance with an example embodiment.

FIG. 1 illustrates a block diagram depicting a system 11 for the magnetic presence detection of a mobile device 22, in accordance with an example embodiment. The system 11 includes a tag 10 that is associated with and/or includes a magnetic proximity detector 8. The tag 10 can be implemented in the context of a wireless system for enabling transactions on an associated network delivering services (e.g., advertisements, data, etc.) to end users in accordance with one aspect of an exemplary embodiment.

Note that the term "tag" as utilized herein can include any kind of device that is non-battery operated (e.g., a non-battery operated device connected to a power supply). In this case, the disclosed detector helps to limit radio spectrum usage and phone battery usage. The term "tag" as utilized herein can also refer to any kind of device that is battery operated, in which case the disclosed detector can additionally limit the tag battery usage.

The tag 10 can transmit particular data 19 when the magnetic proximity detector, which avoids needless battery consumption by the tag 10 and/or the mobile device 22, detects the mobile device 22. The tag 10 can further be associated with and/or include a filter 9 that filters out noisy magnetic signals so as to enhance the detection capability of the magnetic proximity detector 8 and additionally facilitate detection of the mobile device 22 by the magnetic proximity detector 8.

One or more tags such as tag 10 can be implemented as a deployed service access point to the associated network, such as entrances, exits, vehicles, stops, barriers, parking lot gates, etc., each tag having a unique identifier, an irreversible counter, a master key, and a log of previous transactions. The tag need not be connected to any network, thus allowing the positioning of the tag on a variety of service access points, e.g., on vehicles of a transportation system, on entrances to venues, gates to parking lots, etc.

The tag 10 can be powered (e.g., self-contained power supply, not shown). The tag 10 includes a processor 12 in communication with memory 14 and a transceiver 16. The processor 12 may include a random number generator and other suitable components to facilitate the systems and methods discussed hereinafter. The memory 14 may comprise non-volatile and/or volatile memory capable of storing various types of data. The tag 10 may utilize symmetric cryptography (3DES, AES, etc.) or asymmetric cryptography (RSA, ECC, etc.). The memory 14 may include a unique tag identifier (TagID) 18 associated with the tag 10 and which can be supplied by a central system during deployment of the tag 10. The transceiver 16 of the tag 10 may correspond to any suitable component capable of establishing bi-directional communication between the tag 10 and user devices such as, for example, mobile device 22, and/or other devices, such as a controller device (not shown).

In some example embodiments, the tag 10 may incorporate a low-cost Near Field Communication (NFC) small component, which is powered or unpowered, which is also capable of communication with an NFC-enabled user device over a short distance (e.g., up to 10 cm), and which can be affixed to a vehicle, station, turnstile, gate, barrier, or other accoutrement associated with systems and networks delivering services, as illustrated and discussed in further detail herein. It should be appreciated, however, that the targeted usage of the disclosed magnetic detector (i.e., the "detector") is primarily the case where BLE is used instead of NFC, because with NFC, the phone interrogates the tag, which may contain an active NFC booster waken-up by the phone's field; the idle continuous current of such an active booster is very low (~10 µA) and therefore it is not very useful to switch the booster off when no phone is in close proximity of the tag. With BLE, on the other hand, the phone will only answer to an advertisement actively emitted by the tag; without a magnetic detector, the tag should continuously advertise and this would use too high a continuous current (~100 µA); in addition, the phone should be close enough to guarantee a conscious act from its owner (this close distance is also verified by the tag using the RSSI (Received Signal Strength indication)). There is no reason to exclude NFC communication from the disclosed embodiments. However, BLE is the primary application or focus of the disclosed embodiments.

The terms "user device" or "mobile device" can be utilized interchangeably with one another and denotes a device owned by the user and able to contain and/or process an "application" for interacting with the network delivering services to users. Examples of such a user device include, without limitation, mobile phones, personal data assistants, tablets, and other personal electronic devices. The user device or mobile device 22 may be NFC-enabled and/or Bluetooth enabled (e.g., a BLE (Bluetooth Low Energy) enabled device), as well as capable of data communication with one or more wired or wireless networks, as discussed in greater detail herein. In some example embodiments, a user device or mobile device may be, for example, a computing device such as a wearable computing device (e.g., a smartwatch).

It can be appreciated that tags such as tag 10 may be located or placed in a variety of locations and on board vehicles such as, for example, a public transportation vehicle (e.g., a sub, tramway, metro, train, taxis, etc.) or a private commercial transportation vehicle (e.g., an Uber, Lyft, etc.). In such an example scenario, the vehicle and therefore the tag 10 and its magnetic detector 8 may be in close proximity to large alternating magnetic fields, in particular those produced by catenaries. Thus, the filter 9 is configured to filter slow variations of the terrestrial magnetic field in which the vehicle moves and can also filter periodical variations of alternating magnetic fields. The presence of the mobile device 22 can be quickly detected utilizing system 11 without wrongly detecting a strong alternating field.

Figure 2:
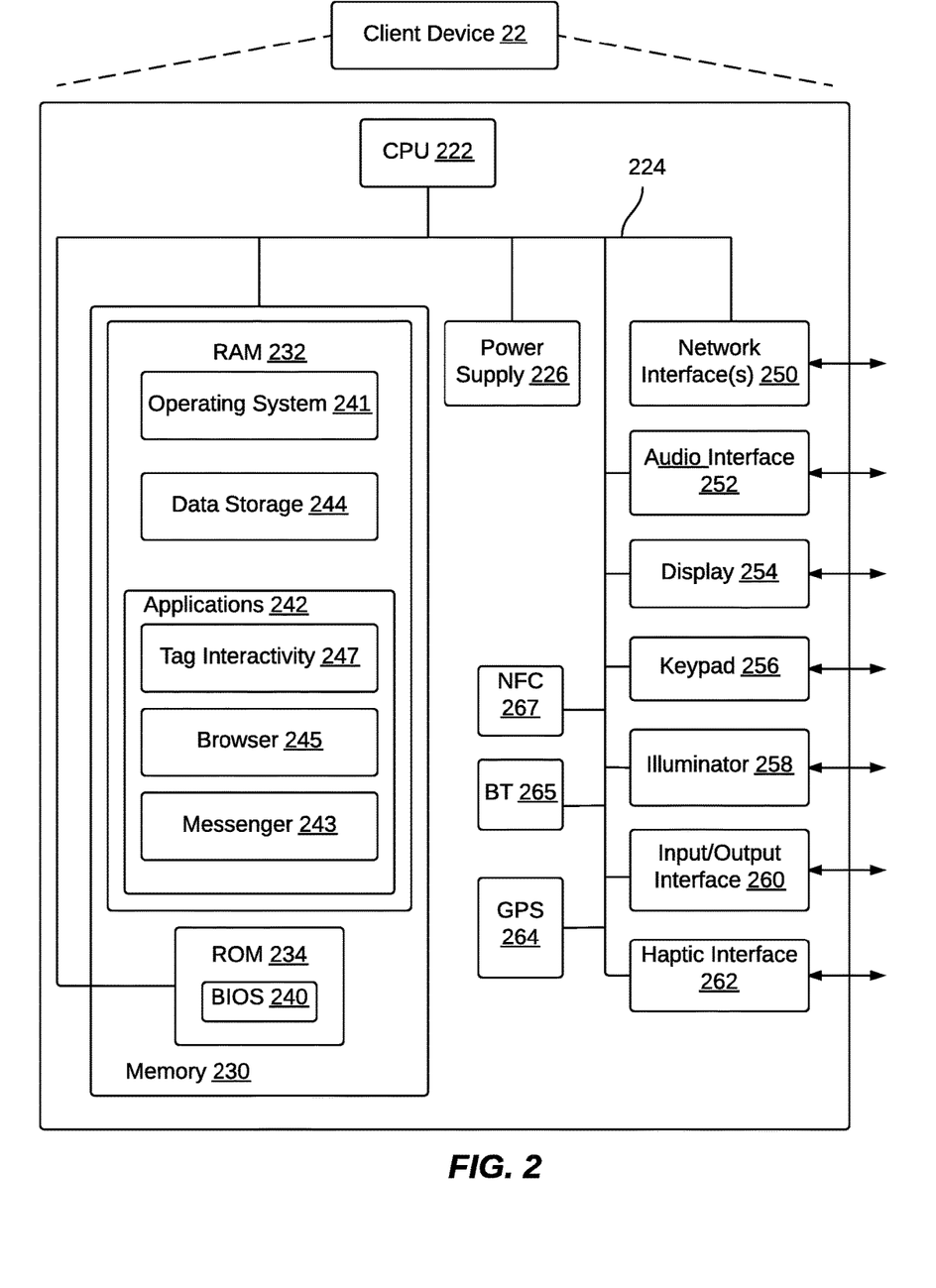
FIG. 2 illustrates a schematic diagram depicting one example embodiment of the mobile device (e.g., a client device) depicted in FIG. 1 and FIG. 3, in accordance with an example embodiment.
Figure 3:
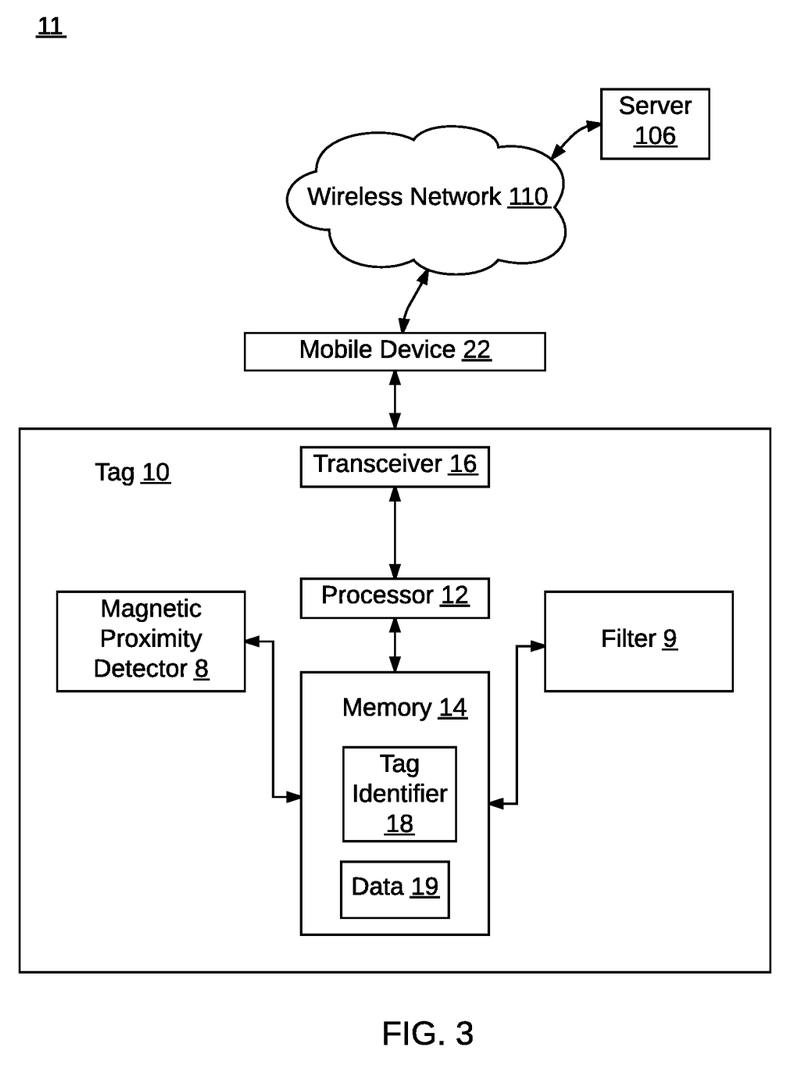
FIG. 3 illustrates a system for the magnetic presence detection of a mobile device that communicates with a wireless network via packet data communications, in accordance with an example embodiment.

FIG. 2 illustrates a schematic diagram depicting one example embodiment of the mobile device 22 (e.g., a client device) depicted in FIG. 1 and FIG. 3, in accordance with an example embodiment. The client device 22 can function: as a computing device capable of sending or receiving signals through a wired or a wireless network such as, for example, network 110 depicted in FIG. 3.

The client device 22 may be implemented as, for example, a desktop computer or a portable device, such as a cellular telephone, a Smartphone, a display pager, a radio frequency (RF) device, an infrared (IR) device, a Personal Digital Assistant (PDA), a handheld computer, a tablet computer, a laptop computer, a wearable computer, or an integrated device combining various features, such as features of the foregoing devices, or the like. In a preferred example embodiment, however, it can be assumed that the client device 22 is a mobile device such as, for example, a smartphone, tablet computing device, a smartwatch, or other wearable computing devices.

A client device such as client device 22 may vary in terms of capabilities or features. The claimed subject matter is intended to cover a wide range of potential variations. For example, a cell phone may include a numeric keypad or a display of limited functionality, such as a monochrome liquid crystal display (LCD) for rendering text and other media. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device such as client device 22 may include or may execute a variety of operating systems, such as operating system 241, including in some example embodiments, a personal computer operating system, such as a Windows®, iOS® or Linux®, or a mobile operating system, such as iOS®, Android®, or Windows Mobile®, or the like. A client device such as client device 22 may include or may execute a variety of possible applications, such as a client software application enabling communication with other devices, such as communicating one or more messages, such as via email, short message service (SMS), or multimedia message service (MMS), including via a network, such as an online social network, including, for example, Facebook®, LinkedIn®, Twitter®, Flickr®, Google+® to provide only a few possible examples.

A client device, such as client device 22, may also include or execute an application to communicate content, such as, for example, textual content, multimedia content, or the like. A client device may also include or execute an application to perform a variety of possible tasks, such as browsing, searching, playing various forms of content, including locally stored or streamed video, or games (e.g., fantasy sports leagues, etc.). The foregoing is provided to illustrate that claimed subject matter is intended to include a wide range of possible features or capabilities. Examples of such applications (or modules) can include a messenger 243, a browser 245, and other client application(s) or module(s) such as a tag module 247 that provides instructions for facilitating interactivity and communications between the client device 22 and the tag 10.

The example client device 22 shown in FIG. 2 generally includes a CPU (Central Processing Unit) 222 and/or other processors (not shown) coupled electronically via a system bus 224 to memory 230, power supply 226, and a network interface 250. The memory 230 can be composed of RAM (Random Access Memory) 232 and ROM (Read Only Memory) 234. Other example components that may be included with client device 22 can include, for example, an audio interface 252, a display 254, a keypad 256, an illuminator 258, and an input/output interface 260. In some example embodiments, a haptic interface 262 and a GPS (Global Positioning System) module or unit 264 along with a Bluetooth (BT) module 265 and an NFC (Near Field Communications) module 267 can also be electronically coupled via the system bus 224 to CPU 222, memory 230, power supply 226, and so on.

The BT (Bluetooth) module 265 can permit communication of client device 22 with other devices, including Bluetooth and/or BLE beacons and/or transponders as discussed herein. The near field communication (NFC) module 267 can facilitate NFC communication with other devices including, e.g., an NFC beacon. With respect to the Bluetooth module 265, it may be implemented as a Bluetooth Low Energy (BLE) module and/or a Bluetooth 4.0 module that implements communications using one or more of BLE systems, standard Bluetooth systems, and/or iBeacon systems specifically. As understood herein, BLE may operate in the same spectrum range (the 2.400 GHz-2.4835 GHz band) as classic Bluetooth technology, but may use a different set of channels. Instead of Bluetooth's seventy nine 1-MHz channels, e.g., BLE employs forty 2-MHz channels. BLE may send data within a channel using Gaussian frequency shift modulation with a one megabyte per second data rate and a maximum transmission power of ten milliwatts (10 mW).

RAM 232 can store an operating system 241, provide for data storage 244, and the storage of applications 242 such as, for example, browser 245 and messenger 243 applications. ROM 234 can include a BIOS (Basic Input/Output System) 240, which is a program that the CPU 222 utilizes to initiate the computing system associated with client device 22.

BIOS 240 can also manage data flow between operating system 241 and components such as display 254, keypad 256, and so on.

Applications 242 can thus be stored in memory 230 and may be "loaded" (i.e., transferred from, for example, memory 230 or another memory location) for execution by the client device 22. Client device 22 can receive user commands and data through, for example, the input/output interface 260. The client device 22 in accordance with instructions from operating system 241 and/or application(s) 242 may then act upon such inputs. The interface 260, in some embodiments, can serve to display results, whereupon a user may supply additional inputs or terminate a session. The software application(s) 242 can include one or more modules such as modules 243, 245, 247, and so on, which can, for example, implement instructions or operations such as those described herein.

FIG. 3 illustrates the system 11 for the magnetic presence detection of a mobile device 22 (i.e., a client device), wherein the mobile device 22 communicates with a wireless network 110 via packet data communications, in accordance with an example embodiment. As indicated previously, the tag 10 may be located on or incorporated into a vehicle such as an automobile or public transportation vehicle (e.g., a city bus, a subway car, etc.).

The filtering of both slow variations of the terrestrial magnetic field in which the vehicle moves and periodical variations of the alternating magnetic field is achieved with a moving average filter on an even number (2m) of measurements, each spaced from the previous one by a time of $(2n+1)/2f$. This even number of measurements spaced with an odd number of half periods of the alternating magnetic field cancels the alternating magnetic field.

Typical or example filtering values are as follows:
$f=50$ Hz
$n=12$, which leads to 4 measurements per second, a good compromise between ergonomics and current consumption; and
$m=6$, which leads to a moving average on a 3 second duration.

Figure 4:
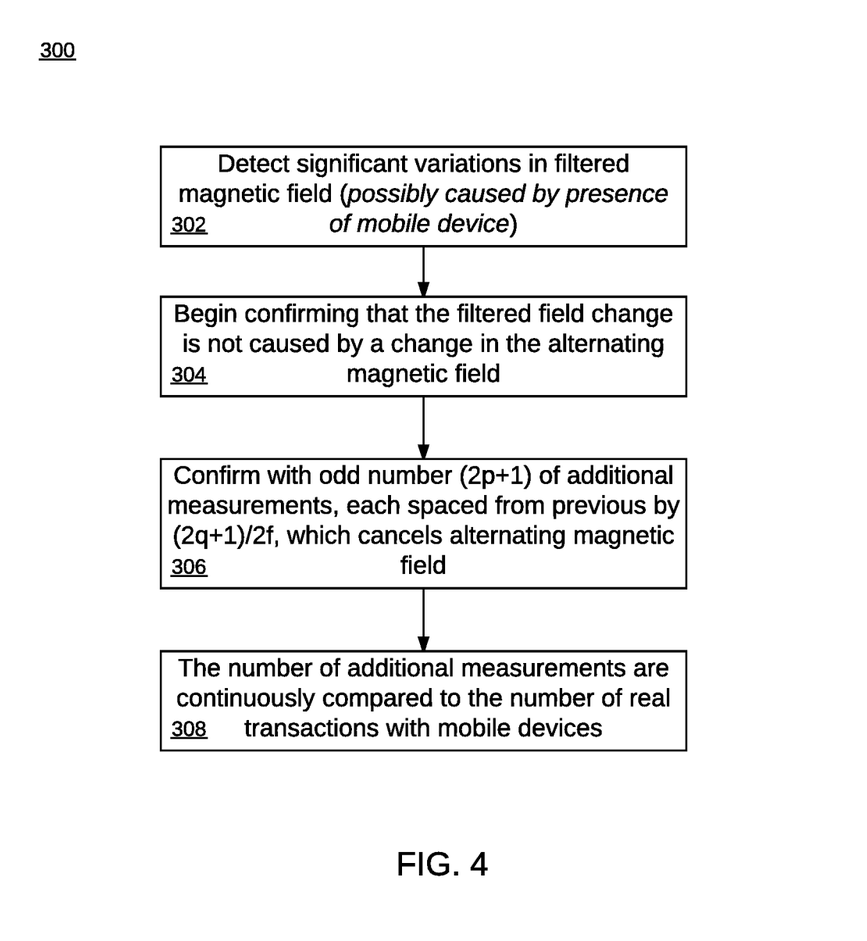
FIG. 4 illustrates a flow chart of operations depicting logical operational steps of a method for improving the magnetic presence detection of a user device or client device, such as a smartphone, tablet computing device, and so on, in accordance with an example embodiment.

FIG. 4 illustrates a flow chart of operations depicting logical operational steps of a method 300 for improving the magnetic presence detection of a user device or client device, such as a smartphone, tablet computing device and so on, in accordance with an example embodiment.

The quick detection of the presence of a mobile device (e.g., a smartphone) such as mobile device 22 without wrongly detecting a strong alternating field or a variation of the terrestrial magnetic field can be accomplished by: a first detection of a significant variation of the filtered field, as indicated at block 302, possibly caused by the presence of a smartphone, and a confirmation that the filtered field change is not caused by a change in the alternating field as shown next in FIG. 4 at block 304.

This confirmation can be accomplished as illustrated at block 306 with an odd number (2p+1) of additional measurements, each spaced from the previous one by $(2q+1)/2f$, which cancels the alternating magnetic field. A typical value for p is 0 (or 1) and a typical value for q is 0, which leads to a 10 (or 30) ms delay to detect the mobile device when $f=50$ Hz.

Besides, the number of these additional measurements can be continuously compared as indicated at block 308 to the number of real transactions with smartphones: if too many useless additional measurements are implemented, the measurement strategy may be temporarily adapted so that these measurements replace the next regular measurements, and therefore, when p=0, the average current consumption is not increased, with the consequence to double the average detection time during this temporary period (e.g., when the vehicle is very close to railways tracks).

The system 11 includes the proximity detector 8, which is associated with the tag 10. The tag 10 transmits particular data when a mobile device such as the mobile device 22 is detected by the magnetic proximity detector 8 so as to avoid needless battery consumption by the tag 10 and/or the mobile device 22. The filter 9 filters out noisy magnetic signals so as to enhance the detection capability of the magnetic proximity detector 8 and facilitate detection of the mobile device 22 by the magnetic proximity detector 8. As indicated previously, the tag 10 may be implemented as an NFC (Near Field Communication) component and the filter 9 filters slow variations of the terrestrial magnetic field and/or periodical variations of an alternating magnetic field. Filtering by the filter 9 is achieved utilizing a moving average filter with respect to an even number (2m) of variations, each spaced a previous measurement by a time of $(2n+1)/2f$, such that an even number of measurements spaced with an odd number of half periods of the alternating magnetic field cancels the alternating magnetic field. The data 19 contained in memory 14 may include data, such as, for example, a message, an advertisement, a notification, etc.

Note that in some example embodiments, the tag 10 can be implemented as a Bluetooth-enabled tag used in, for example, public transport vehicles (e.g., buses, subways, trams, etc.) to enable travel validation with mobile phones such as the mobile device 22 shown in FIG. 3. The disclosed embodiments thus describe a solution to implement a magnetic proximity detector that can cause the tag 10 to send Bluetooth advertisements (e.g., data 19) only when a nearby phone such as mobile device 22 is detected, so as to avoid needless battery consumption. This approach describes a technique to filter out noisy magnetic signals such as the Earth's magnetic field, and alternative magnetic fields caused by external structures present in the urban environment, such as electric railway catenaries, tracks, or tramways, and so on.

It can be appreciated that some example embodiments may be implemented in which the smartphones (e.g., client devices) obtain from the network a "local" parameter from the network 110 and transmit it to the tag (e.g., the frequency of the periodic alternating magnetic fields—e.g., 50 or 60 Hz). In some cases, an auto-learning of this frequency with respect to the tag itself may be implemented in which the tag "realizes" that the filtering of periodic alternating magnetic fields is not effective enough.

The wireless network 110 shown in FIG. 3 can be implemented as a packet-based wireless network that communicates via packet based wireless data communications with the mobile device 22. The wireless network 110 may be, for example, a WAN (Wide Area Network)/LAN (Local Area Network), a WiFi network, a cellular communications network, and so on. The wireless network 110 may further communicate with a server 106, which can contain memory and processor components, and which can store and process operations such as described herein.

In some example embodiments, the server 106 may function as a content server that is configured to provide content via a network (e.g., a client/server network) to other networks and devices. A content server may, for example, host a site, such as a social networking site, examples of which may include, without limitation, Flickr®, Twitter®, Facebook®, LinkedIn®, or a personal user site (e.g., such as a blog, vlog, online dating site, etc.). A content server may also host a variety of other sites, including but not limited to, business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type, or programmable consumer electronics, etc.

The network 110 can couple devices so that communications may be exchanged, such as between the server 106 and the client device 22 or other types of devices, including between wireless devices coupled via a wireless network, for example. The network 110 may also include mass storage, such as network-attached storage (NAS), a storage area network (SAN), or other forms of computer or machine-readable media, for example. A network may include the Internet, one or more Local Area Networks (LANs), one or more Wide Area Networks (WANs), wire-line type connections, wireless type connections, or any combination thereof. Likewise, sub-networks may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

The wireless network 110 depicted in FIG. 3 may couple client devices with the network. That is, such a wireless network may employ stand-alone ad-hoc networks, mesh networks, wireless LAN (WLAN) networks, cellular networks, or the like. A wireless network such as wireless network 110 can further include a system of terminals, gateways, routers, or the like coupled by wireless radio links, or the like, which may move freely, randomly, or organize themselves arbitrarily, such that network topology may change at times even rapidly. A wireless network may further employ a plurality of network access technologies including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Note that signal packets communicated via a network, such as a network of participating digital communication networks (e.g., network 110) may be compatible with or compliant with one or more protocols. Signaling formats or protocols employed may include, for example, TCP/IP, UDP, DECnet, NetBEUI, IPX, AppleTalk, or the like. Versions of the Internet Protocol (IP) may include IPv4 or IPv6.

The Internet refers to a decentralized global network of networks. The internet includes Local Area Networks (LANs), Wide Area Networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc., that may route the signal packet in accordance with a target address and availability of a network path to the target address.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A system for magnetic presence detection, said system comprising:
   a magnetic proximity detector associated with a tag, wherein said tag transmits particular data when a mobile device is detected by said magnetic proximity detector; and
   a filter that filters out noisy magnetic signals and periodical variations of an alternating magnetic field and wherein filtering by said filter is achieved utilizing a moving average filter with respect to an even number of measurements each spaced with an odd number of half periods of said alternating magnetic field so as to enhance a detection capability by said magnetic proximity detector and facilitate detection of said mobile device by said magnetic proximity detector.

2. The system of claim 1 wherein said filter filters slow variations of the terrestrial magnetic field.

3. The system of claim 1 wherein said tag transmits said particular data when said mobile device is detected by said magnetic proximity detector so as to avoid needless battery consumption by said tag.

4. The system of claim 3 wherein said mobile device comprises a smartphone.

5. The system of claim 1 wherein said tag comprises a Bluetooth enabled tag.

6. The system of claim 1 wherein said tag is located on or in a vehicle.

7. The system of claim 1 wherein said particular data comprises a message.

8. The system of claim 1 wherein said particular data comprises an advertisement.

9. The system of claim 1 wherein said magnetic proximity detector rapidly detects a presence of said mobile device without incorrectly detecting a strong alternating field.

10. A system for magnetic presence detection, said system comprising:
   a magnetic proximity detector associated with a tag, wherein said tag transmits particular data when a mobile device is detected by said magnetic proximity detector; and
   a filter that filters out noisy magnetic signals so as to enhance a detection capability by said magnetic proximity detector and facilitate detection of said mobile device by said magnetic proximity detector wherein said filter filters slow variations of the terrestrial magnetic field and wherein said filter filters periodical variations of an alternating magnetic field and wherein filtering by said filter is achieved utilizing a moving average filter with respect to an even number of measurements each spaced with an odd number of half periods of said alternating magnetic field.

11. The system of claim 10 wherein said tag is located on or in a vehicle.

12. The system of claim 10 wherein said particular data comprises a message.

13. The system of claim 10 wherein said particular data comprises an advertisement.

14. The system of claim 10 wherein said magnetic proximity detector rapidly detects a presence of said mobile device without incorrectly detecting a strong alternating field.

15. A method for magnetic presence detection, said method comprising:
   associating a magnetic proximity detector with a tag;
   transmitting particular data from said tag when a mobile device is detected by said magnetic proximity detector; and
   filtering out noisy magnetic signals with a filter wherein said filtering includes filtering by said filter utilizing a moving average filter with respect to an even number of measurements each spaced with an odd number of half periods of said alternating magnetic field and wherein said filter filters slow variations of the terrestrial magnetic field and periodical variations of an alternating magnetic field so as to enhance a detection capability by said magnetic proximity detector and facilitate detection of said mobile device by said magnetic proximity detector.

16. The method of claim 15 wherein said mobile device communicates with a wireless network via packed based data communications.

17. The method of claim 15 wherein said tag comprises a Bluetooth enabled tag.

18. The method of claim 17 wherein said mobile device comprises a smartphone.

19. The method of claim 15 wherein said tag is located on or in a vehicle.

20. The method of claim 15 wherein said particular data comprises at least one of: a message and an advertisement.

* * * * *